US009536063B2

(12) United States Patent
Xing et al.

(10) Patent No.: US 9,536,063 B2
(45) Date of Patent: Jan. 3, 2017

(54) METHODS AND APPARATUS FOR PROTECTING SOFTWARE FROM UNAUTHORIZED COPYING

(71) Applicants: Bin Xing, Hillsboro, OR (US); Bo Zhang, Raleigh, NC (US); Mark W. Shanahan, Raleigh, NC (US); James D. Beaney, Jr., Raleigh, NC (US)

(72) Inventors: Bin Xing, Hillsboro, OR (US); Bo Zhang, Raleigh, NC (US); Mark W. Shanahan, Raleigh, NC (US); James D. Beaney, Jr., Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,743

(22) PCT Filed: Oct. 24, 2013

(86) PCT No.: PCT/US2013/066715
§ 371 (c)(1),
(2) Date: Dec. 12, 2013

(87) PCT Pub. No.: WO2015/060858
PCT Pub. Date: Apr. 30, 2015

(65) Prior Publication Data
US 2015/0121536 A1 Apr. 30, 2015

(51) Int. Cl.
*G06F 21/12* (2013.01)
*G06F 21/53* (2013.01)

(52) U.S. Cl.
CPC ............... *G06F 21/12* (2013.01); *G06F 21/53* (2013.01); *G06F 2221/03* (2013.01); *G06F 2221/07* (2013.01)

(58) Field of Classification Search
CPC .................................. G06F 21/12; G06F 21/14
See application file for complete search history.

(56) References Cited

U.S. PATENT DOCUMENTS 7,712,143 B2    5/2010    Comlekoglu
7,958,497 B1    6/2011    Lindo et al.
(Continued)

FOREIGN PATENT DOCUMENTS

KR    10-2012-0099472 A    9/2012
WO    2011/078855 A1    6/2011
(Continued)

OTHER PUBLICATIONS

Intel, "Intel Technology Journal", vol. 10, Issue 3, Virtualization in the Enterprise, 2006, 13 pages, web page available at: www.neotextus.net/papers/itj06.
(Continued)

*Primary Examiner* — Yin-Chen Shaw
*Assistant Examiner* — Darshan Dhruv
(74) *Attorney, Agent, or Firm* — Barre Law Firm, PLLC

(57) ABSTRACT

A processing device provides a method for protecting a program from unauthorized copying. The processing device may include an encrypted version of the program. According to one example method, the processing device creates a secure enclave, and in response to a request to execute the encrypted program, the processing device automatically generates a decrypted version of the program in the secure enclave by decrypting the encrypted program in the secure enclave. After automatically generating the decrypted version of the program in the secure enclave, the processing device may automatically execute the decrypted version of the program in the secure enclave. Other embodiments are described and claimed.

22 Claims, 8 Drawing Sheets

(56) References Cited

U.S. PATENT DOCUMENTS

| | | | |
|---|---|---|---|
| 8,140,655 B1 | 3/2012 | Schantz et al. | |
| 8,286,001 B2* | 10/2012 | Ye | G06F 12/1408 380/277 |
| 8,352,740 B2* | 1/2013 | England | H04L 9/0897 713/170 |
| 2007/0198851 A1* | 8/2007 | Goto | G06F 12/145 713/187 |
| 2008/0077994 A1 | 3/2008 | Comlekoglu | |
| 2008/0092235 A1 | 4/2008 | Comlekoglu et al. | |
| 2008/0127143 A1* | 5/2008 | Lagergren | G06F 8/4441 717/148 |
| 2008/0307488 A1 | 12/2008 | Hammond et al. | |
| 2009/0187769 A1* | 7/2009 | Camiel | G06F 21/123 713/189 |
| 2009/0292893 A1* | 11/2009 | Henry | G06F 21/72 711/163 |
| 2009/0292919 A1* | 11/2009 | England | H04L 9/0897 713/168 |
| 2010/0281273 A1* | 11/2010 | Lee | G06F 21/72 713/190 |
| 2011/0265180 A1* | 10/2011 | Unagami | G06F 11/3048 726/22 |
| 2012/0036308 A1* | 2/2012 | Swanson | G06F 12/1433 711/1 |
| 2012/0042380 A1* | 2/2012 | Kohiyama | G06F 21/10 726/22 |
| 2012/0159184 A1* | 6/2012 | Johnson | G06F 12/1466 713/189 |
| 2012/0163589 A1 | 6/2012 | Johnson et al. | |
| 2012/0166795 A1* | 6/2012 | Wood | G06F 21/57 713/155 |
| 2012/0233449 A1* | 9/2012 | Thibadeau | G06F 21/575 713/2 |
| 2012/0235912 A1 | 9/2012 | Laubach | |
| 2012/0265976 A1* | 10/2012 | Spiers | H04L 63/0218 713/2 |
| 2012/0331550 A1* | 12/2012 | Raj | G06F 21/575 726/22 |
| 2013/0159729 A1* | 6/2013 | Thom | G06F 21/57 713/189 |
| 2013/0182837 A1 | 7/2013 | Maliszewski et al. | |
| 2013/0232345 A1 | 9/2013 | Johnson et al. | |
| 2013/0339971 A1 | 12/2013 | Boland et al. | |
| 2014/0283093 A1 | 9/2014 | Xing | |
| 2014/0317372 A1* | 10/2014 | Herrick | G06F 12/1458 711/163 |

FOREIGN PATENT DOCUMENTS

| | | |
|---|---|---|
| WO | 2013/180736 A1 | 12/2013 |
| WO | 2014/143671 A1 | 9/2014 |

OTHER PUBLICATIONS

Memory-Mapped I/O, "Memory-mapped I/O—The GNU C Library", retrieved on Aug. 13, 2013, 5 pages, web page available at: http://www.gnu.org/software/libc/manual/html_node/Memory_002dmapped-I_002fO.html.

Design Overview, "JNI Interface Functions and Pointers", Chapter 2, retrieved on Aug. 13, 2013, 2013, 7 pages, web page available at: http://docs.oracle.com/javase/7/docs/technotes/guides/jni/spec/design.html.

Oracle, "The Invocation API" Chapter 5, Java Native Interface Specification, retrieved on Aug. 13, 2013, 2011, 6 pages, web pages available at: http://docs.oracle.com/javase/6/docs/technotes/guides/jni/spec/invocation.html.

Wikipedia, "Remote Procedure Call", retrieved on Aug. 13, 2013, 5 pages, web page available at: http://en.wikipedia.org/wiki/Remote_procedure_call.

Goffman et al., "Identification and Execution of Subsets of a Plurality of Instructions in a More Secure Execution Environment", U.S. Appl. No. 13/997,899, filed Jun. 25, 2013, 19 pages.

Xing, "A Method, Apparatus, System, and Computer Readable Medium to Provide Secure Operation", U.S. Appl. No. 13/838,038, filed Mar. 15, 2013, 58 pages.

Non-Final Office Action received for U.S. Appl. No. 13/838,038, mailed on Oct. 23, 2014, 20 Pages.

International Search Report and Written Opinion received for PCT Patent Application No. PCT/US2014/027684, mailed on Jul. 1, 2014, 9 pages.

International Search Report and Written Opinion received for PCT Patent Application No. PCT/US2013/066715, mailed on Jun. 26, 2014, 11 pages.

Notice of Allowance received for U.S. Appl. No. 13/838,038, mailed on Feb. 27, 2015, 13 pages.

Office Action received for Korean Patent Application No. 10-2015-7021623, mailed on May 19, 2016, 3 pages of English translation and 5 pages of Korean Office Action.

International Preliminary Report on Patentability and Written Opinion Received for PCT Application No. PCT/US2013/066715, mailed on May 6, 2016, 8 pages.

\* cited by examiner

METHODS AND APPARATUS FOR PROTECTING SOFTWARE FROM UNAUTHORIZED COPYING

CROSS REFERENCE TO RELATED APPLICATIONS

This application is a national stage application under 35 U.S.C. §371 of international application serial no. PCT/US2013/066715, entitled "METHODS AND APPARATUS FOR PROTECTING SOFTWARE FROM UNAUTHORIZED COPYING," filed on Oct. 24, 2013.

TECHNICAL FIELD

Embodiments described herein generally relate to data processing and in particular to methods and apparatus for protecting software from unauthorized copying.

BACKGROUND

The hardware and firmware components in a conventional data processing device may be referred to collectively as the system platform. An operating system may run on top of the system platform, providing a layer of abstraction that enables developers to disregard many of the specific details of the various hardware and firmware components of the underlying system platform. Many different operating systems have been created for many different system platforms.

In addition, software has been created to allow a single application to run on different operating systems. Such software provides another layer of abstraction, on top of the operating system. That layer of abstraction may be referred to as a virtual machine (VM) or a virtual runtime environment (VRE).

If an application is designed to run in a VRE, the application is not limited to a particular system platform or a particular operating system, but can be used on various different platforms with various different operating systems. The term "virtual application" may be used in general to refer to a program, an application, an applet, and/or other software that is designed to run in a VRE. By contrast, the term "virtualization software" may be used in general to refer to software that is designed to provide the VRE itself. For instance, a processing device may run virtualization software that creates a VRE which, in turn, enables a virtual application to run within that VRE.

Virtualization software typically includes a collection of components which work together to create the VRE. That collection of components may be referred to as a virtualization package.

Different developers have created various different virtualization packages to provide various different varieties of VREs. For instance, software distributed under the JAVA trademark provides a so-called "Java Runtime Environment" (JRE) or "Java Virtual Machine" (JVM). That virtualization package includes core classes and supporting libraries for implementing the JRE. Other software packages designed to provide VREs include, without limitation, products distributed under names or trademarks such as PARROT and COMMON LANGUAGE RUNTIME (CLR).

One of the challenges currently faced by the software industry is the challenge of protecting virtual applications and other software from unauthorized copying. Unauthorized copying of software may also be referred to as software piracy.

DESCRIPTION OF EMBODIMENTS

One way to discourage the unauthorized copying of software is to encrypt the software before distributing it. However, the software will need to be decrypted before it runs. So there remains a risk that the software will be copied after it has been decrypted.

As described in greater detail below, the present disclosure describes technology which allows the software provider to distribute an encrypted version of an application to a customer's processing device, and which allows that processing device to run a decrypted version of the application in a secure enclave, without ever exposing the decrypted version of the application outside of the enclave.

Figure 1:
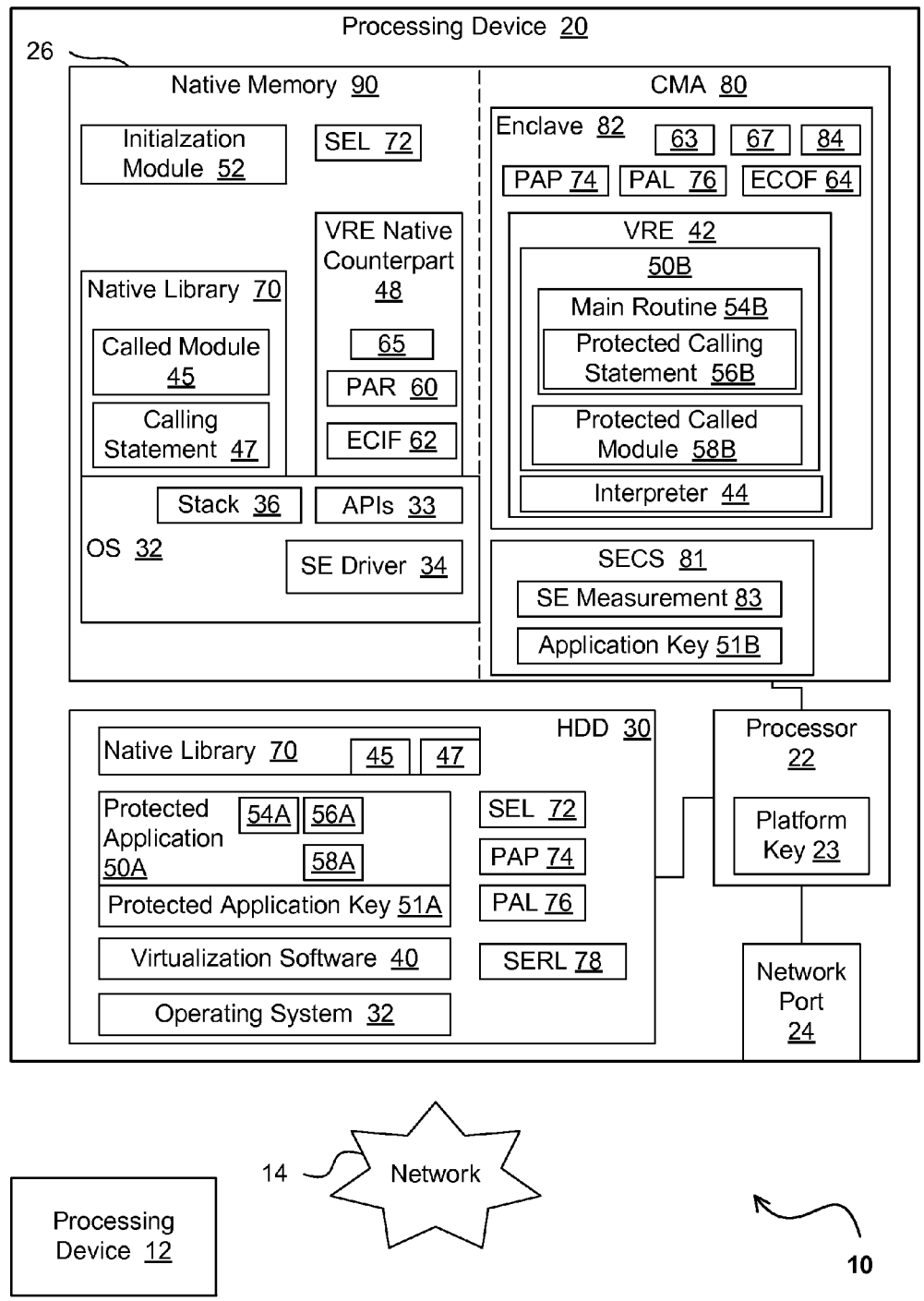
FIG. 1 is a block diagram of an example data processing system with features for protecting software from unauthorized copying.

FIG. 1 is a block diagram of an example embodiment of a data processing system 10 with features for protecting software from unauthorized copying. In the embodiment of FIG. 1, data processing system 10 includes a local processing device 20 and a remote processing device 12. Any suitable types of processing devices may be used for local processing device 20 and remote processing device 12. In some embodiments, the remote processing device may be omitted.

As used herein, the terms "processing system" and "data processing system" are intended to broadly encompass a single machine, or a system of communicatively coupled machines or devices operating together. For instance, two or more machines may cooperate using one or more variations on a peer-to-peer model, a client/server model or a cloud computing model to provide some or all of the functionality described herein. In the embodiment of FIG. 1, the processing devices in processing system 10 connect to or communicate with each other via one or more networks 14. The networks may include local area networks (LANs) and/or wide area networks (WANs) (e.g., the Internet). For purposes of this Description of Embodiments, local processing device 20 may also be referred to simply as "processing device 20."

In the embodiment of FIG. 1, processing device 20 features at least one central processing unit (CPU) or processor 22, along with random access memory (RAM) 26, a network port 24, and one or more nonvolatile mass data storage devices such as a hard disk drive (HDD) 30 responsive to or coupled to processor 22. Processor 22 may include one or more processor cores. A processor core may also be referred to as a processing unit or a processing element.

Additional input/output (I/O) components (e.g., a keyboard, a display, etc.) may also be responsive to or coupled to processor 22. Processor 22 may include a platform key 23.

In the embodiment of FIG. 1, processing device 20 is configured to sequester some of RAM 26, as illustrated by the vertical dashed line in RAM 26, to provide for one or more secure enclaves 82. The sequestered memory space may be referred to as the crypto memory aperture (CMA) 80. In one embodiment, CMA 80 is a region of the physical address space which is reserved to provide for one or more secure enclaves. In the embodiment of FIG. 1, CMA 80 contains secure enclave 82, along with associated structures or items for supporting security. For instance, CMA 80 may include a secure enclave control structure (SECS) 81, and SECS 81 may contain a secure enclave measurement 83 and an application key 51B, as described in greater detail below. The memory space outside of CMA 80, which may be referred to as the native memory 90, may remain relatively unprotected.

In one embodiment, a secure enclave provides an isolated execution environment for any application to process confidential data. An enclave is privacy and integrity protected, so that only the code inside an enclave can access that enclave's data. Also, a secure enclave does not allow code from outside of the enclave to be executed. For instance, if a conventional application were to run in a secure enclave, that application would be unable to access operating system application programming interfaces (APIs) residing outside of the enclave. Further details on secure enclaves, according to at least one embodiment, are described in greater detail below. In addition, more details for at least one embodiment of secure enclave technology may be found in U.S. patent application publication no. 2012/0159184, entitled "Technique for Supporting Multiple Secure Enclaves" (hereinafter "the Secure Enclave Application").

In the embodiment of FIG. 1, HDD 30 and/or other storage media in processing device 20 contains various software components which may be copied into RAM and executed. For instance, HDD 30 includes an operating system (OS) 32 and a native library 70. Native library 70 may include software that is designed to run on operating system 32. In the embodiment of FIG. 1, that software includes a native called module 45 and a native calling statement 47.

HDD 30 also includes virtualization software 40. Processing device 20 may use virtualization software 40 to create VRE 42, for example. For instance, virtualization software 40 may include code for implementing an interpreter 44 that allows virtual applications to execute in VRE 42. Virtualization software 40 may also contain supporting libraries, core classes, and other components for VRE 42.

Operating system 32 may run from native memory 90, and it may provide a distinct stack 36 for each active thread. OS 32 may also include various APIs 33 which enable other software components to use services provided by operating system 32. In one embodiment, software running in secure enclave 82 is not allowed to access any of the OS APIs 33. However, as described in greater detail below, processing device 20 provides new calling conventions to enable software to call functions across enclave boundaries. For instance, a protected calling statement that runs in VRE 42 within secure enclave 82 may use those conventions to call native called module 45, and native calling statement 47 may use those conventions to call a protected called module that runs in VRE 42 within secure enclave 82. In addition, processing device 20 provide an SE driver 34 that loaders for protected applications may use to create secure enclaves. For example, SE driver 34 may be a kernel mode component, it may be untrusted, and it may be used for managing an enclave page cache within CMA 80. In one embodiment, SE driver 34 participates in enclave creation only, enabling a program or application to invoke specialized instructions for preparing enclaves like ECREATE, EADD, EEXTEND, and EINIT. In the embodiment of FIG. 1, SE driver 34 does not belong to any particular application, and it is provided as part of operating system 32.

HDD 30 may also include a virtual application that is designed to run within VRE 42. However, that virtual application may be stored on HDD 30 in a partially or completely encrypted form, as depicted in FIG. 1 by protected application 50A. In the embodiment of FIG. 1, protected application 50A includes a main routine 54A, a protected calling statement 56A, and a protected called module 58A. In addition, the key for decrypting protected application 50A may itself also be stored on HDD 30. In the embodiment of FIG. 1 such a key is saved in encrypted form, as depicted by protected application key 51A.

The protected components that are stored on HDD 30 may be partially or completely encrypted, using any suitable encryption technology. In one embodiment, protected application 50A has been completely encrypted using symmetric key encryption, based on a decrypted version 51B of protected application key 51A. In one embodiment, protected application key 51A has been completely encrypted using symmetric key encryption, based on an enclave key 84, and enclave key 84 is tied to secure enclave 82. For instance, a protected application loader (PAL) 76 may derive enclave key 84 based at least in part on secure enclave measurement 83 and platform key 23. Thus, protected application key 51A may be tied to a specific enclave in a specific device.

From one perspective, components such as main routine 54A, protected calling statement 56A, and protected called module 58A may be considered virtual applications. From another perspective, such modules may be considered components of a larger virtual application, such as protected application 50A. In one embodiment, protected application 50A is bytecode. Additionally, many different approaches and/or mechanisms may be used to implement protected applications. For instance, an application may be implemented as a class library. Also, an application may also be referred to as a program, and an application key may be referred to as a program key. Also, a program executing within a secure enclave may be referred to as a protected program, while a program executing outside of a secure enclave may be referred to as an unprotected program.

In one embodiment, protected application 50A is a virtual application that was created by a software developer and that may be distributed by the software developer or by some other authorized entity, such as an independent software vendor (ISV) or a distributor. For purposes of this document, unless the context clearly requires otherwise, the term "developer" denotes the software developer and/or any related entities such as ISVs, distributors, licensing authorities that provide authentication services for the software developer, etc.

HDD 30 may also include a secure enclave loader (SEL) 72, a protected application provisioner (PAP) 74, and a protected application loader (PAL) 76. As described in greater detail below, SEL 72, PAP 74, and PAL 76, when launched, may perform various operations to prepare processing device 20 to execute one or more protected applications. For instance, SEL 72 may create a secure enclave and may launch PAP 74 and/or PAL 76 within that secure enclave.

HDD 30 may also include a secure enclave runtime library (SERL) 78. SERL 78 may include functions, programs, APIs, etc., that other components (e.g., SEL 72) may use to create secure enclaves, and SERL 78 may facilitate data exchange between an enclave and its hosting application. SERL 78 may include libraries linked into both trusted and untrusted parts of an application. Accordingly, some components of SERL 78 may run from native memory, and others may run within a secure enclave. In one embodiment, SERL 78 provides functions for creating and managing enclaves, such as functions for building or compiling an enclave image file at build time and functions for loading an enclave into the EPC from its image file at run time using instructions such as ECREATE, EADD, EEXTEND, and EINIT. SERL 78 may also provide functions for managing trusted threads, and SERL 78 may use SE driver 34 to perform certain subtasks in the untrusted space. SERL 78 may also provide the program that serves as the entry point for a secure enclave. SERL 78 may also provide wrappers for certain specialized instructions designed for enclaves "enclave get key" or "EGETKEY," "enclave report" or "EREPORT," and "enclave exit" or "EEXIT"), and SERL 78 may govern the calling conventions for calling in to a secure enclave and for calling out from a secure enclave.

In one embodiment, secure enclaves must be fully created before being entered. In one embodiment, SEL 72 is responsible for properly laying out the content of a secure enclave in memory before launching software in that enclave. For example, SEL 72 may be responsible for laying out a secure enclave for PAL 76 the same way each time, in order to achieve the same valid enclave measurement each time PAL 76 executes. Likewise, SEL 72 may be responsible for laying out other secure enclaves (e.g., one secure enclave for an independent PAP and another secure enclave for the PAL and the protected application) the same way each time.

In the embodiment of FIG. 1, virtualization software 40 also includes control logic and other data for implementing a VRE native counterpart (VNC) 48 that resides in native memory 90. VNC 48 may facilitate cooperation between protected virtual applications in VRE 42 and applications outside of VRE 42. For instance, as described in greater detail below, VNC 48 may enable a protected calling statement 56B within VRE 42 to interact with native called module 45; and VNC 48 may enable native calling statement 47 to interact with a protected called module 58B.

For instance, VNC 48 may include a specialized function or program that enables modules outside of secure enclave 82 to call modules within secure enclave 82. This specialized function may be referred to as an "enclave call in" (ECI) function (ECIF) 62. Similarly, a statement which uses ECIF 62 may be referred to as an ECI statement. Thus, native software may include an ECI statement that uses ECIF 62 to call in to protected software within secure enclave 82. VNC 48 may also facilitate execution of protected applications within VRE 42, for instance by providing access to operating system services.

Similarly, secure enclave 82 may include a specialized function that enables modules within VRE 42 within secure enclave 82 to call modules outside of secure enclave 82. This specialized function may be referred to as an "enclave call out" (ECO) function (ECOF) 64. Similarly, a statement which uses ECOF 64 may be referred to as an ECO statement. Thus, an application may include, an ECO statement that uses ECOF 64 to call out to native software from inside secure enclave 82.

For purposes of this disclosure, the term "VRE native interface (VNI) call" may be used to refer to (a) a call from a module running within VRE 42 to a module outside of VRE 42, as well as a call from outside of VRE 42 to a module within VRE 42. For instance, ECIF 62 and ECOF 64 may use VNI calls. In some respects. VNI calls may be similar to Java Native Interface (JNI) calls.

Figure 2:
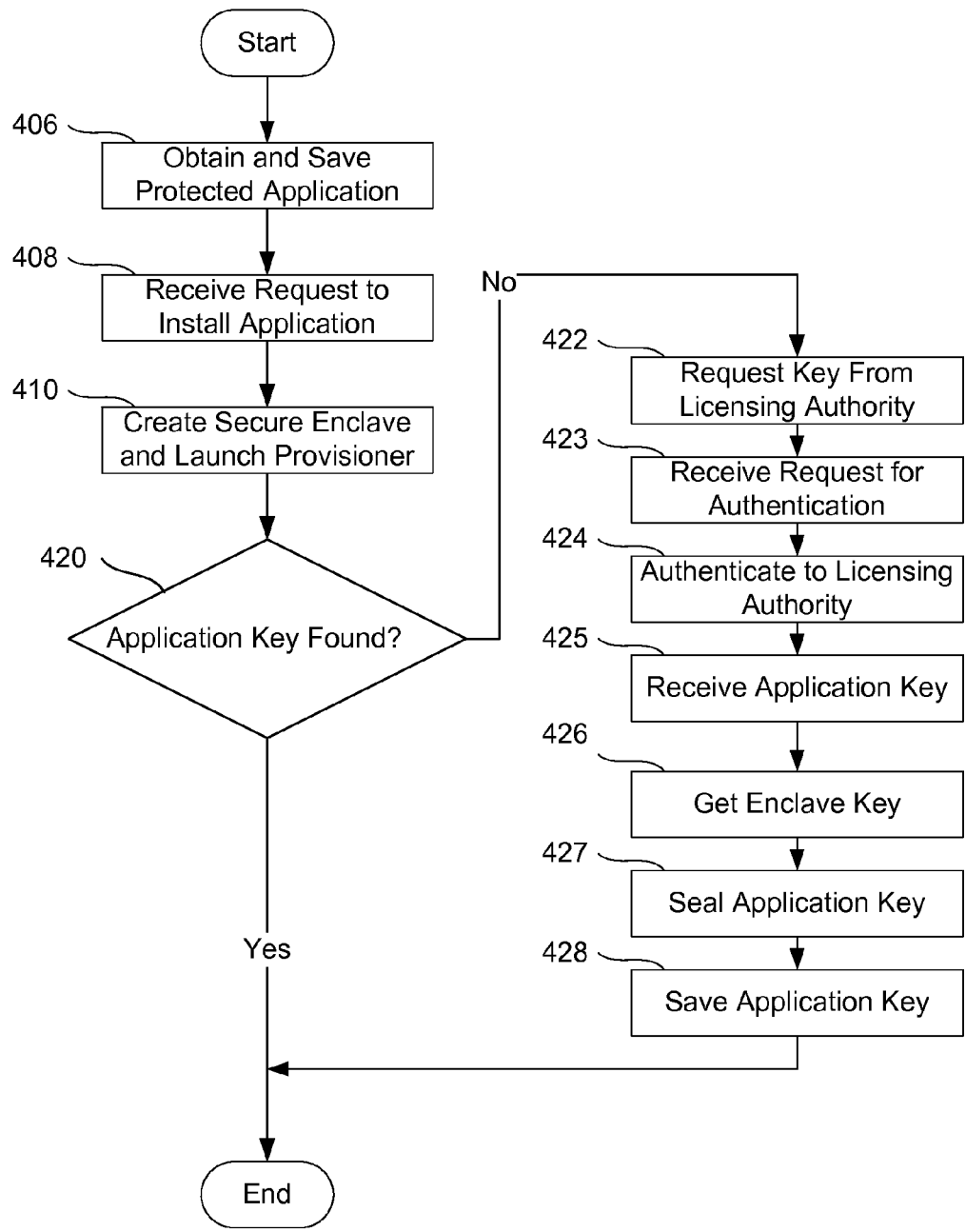
FIG. 2 is a flowchart of an example embodiment of a process for obtaining and installing a protected application.

To provision or install a protected application, processing device 20 may use a process like the one illustrated in FIG. 2, for example.

FIG. 2 is a flowchart of an example embodiment of a process for obtaining and installing protected application 50A. The illustrated process begins at block 406 with processing device 20 obtaining protected application 50A, possibly in response to user input requesting that action. Processing device 20 may use any suitable approach to obtain protected application 50A, including without limitation downloading protected application 50A from remote processing device 12 or copying protected application 50A from a local installation medium. In one embodiment, processing device 20 obtains protected application 50A by obtaining an enclave image that includes protected application 50A. In other words, protected application 50A may be embedded into (or packaged together with) that enclave image. When processing device 20 obtains protected application 50A, processing device 20 may save protected application 50A to HDD 30. Some or all of protected application 50A may be encrypted. For instance, before making protected application 50A available for download or distribution, the developer may have converted a plaintext version of protected application 50B into the encrypted version 50A by using symmetric encryption and application key 51B.

Processing device 20 may then receive a request to install protected application 50A, as shown at block 408. In response, processing device 20 may use SEL 72 to create a secure enclave, and SEL 72 may launch PAP 74 to execute within that secure enclave, as indicated at block 410.

In the embodiment of FIG. 2, SEL 72 is an untrusted component that runs from native memory 90. SEL 72 may use various operations or instructions to create the secure enclave and to launch PAP 74 within the secure enclave. For instance, SEL 72 may call SE driver 34 with parameters instructing SE driver 34 to invoke ECREATE. SEL 72 may then make a sequence of calls to SE driver 34 with parameters instructing SE driver 34 to execute a sequence of EADD or extend instructions, to add and measure code and data pages. PAP 74 may be included in those pages. SEL 72 may then call SE driver 34 with parameters instructing SE driver 34 to execute an EINIT instruction, to finish the enclave initialization process and lock down the measurement. In one embodiment, an enclave cannot be entered until after EINIT has been invoked, and once EINIT has been invoked, no further EADD or extend operations are allowed. In one embodiment, SEL 72 is a user mode component, but some or all of the instructions used by SE driver 34 to provision the secure enclave are privileged instructions that can only be invoked in kernel mode. Accordingly, SE driver 34 enables SEL 72 to create an enclave by invoking those privileged instructions in kernel space on behalf of SEL 72.

In one embodiment, ECIF 62 operates as a proxy, and SEL 72 uses ECIF 62 to interact with the secure enclave. For instance, after ENIT has been invoked, SEL 72 may then call ECIF 62 with parameters that (a) instruct ECIF 62 to enter the secure enclave, that (b) identify PAP 74 as the program within the secure enclave to ultimately receive control after the secure enclave has been entered, and that (c) provide the address of a memory buffer holding protected application 50A. ECIF 62 may marshall the parameters to identify PAP 74 and to locate protected application 50A onto the stack.

Then ECIF 62 may execute EENTER with a parameter that provides the linear address of a thread control structure (TCS) within the enclave. In particular, the TCS parameter of the EENTER instruction may identify a TCS which contains the address of a thread entry point for the enclave. In other words, the TCS may contain a pointer to a program within the enclave that serves the entry point for the enclave. That program may be referred to as the main enclave routine 67, and it may come from SERL 78. In one embodiment, TCS pages are measured. Consequently, the untrusted code cannot use an address different than the one assumed by the enclave vendor without breaking the measurement. The TCS may also contain a pointer to a state save area (SSA) for the enclave.

In addition, SERL 78 may use a table (generated at build time) to track the addresses of stubs inside the enclave, and an ECIF proxy may provide the index of its corresponding stub in a register before invoking EENTER, to enable main enclave routine 67 to dispatch the call. For instance, ECIF 62 may provide an index to identify a corresponding ECIF stub 63 within secure enclave 82.

Accordingly, when EENTER is executed, processor 22 may (a) enter a specific thread of the enclave, (b) mark the TCS for that thread as busy, (c) transition the thread into enclave mode, and (d) transfer control to the identified entry point, within the enclave. For instance, as indicated above, on behalf of SEL 72, ECIF 62 may execute EENTER with an entry point parameter that points to the main enclave routine. Consequently, processing device 20 launches main enclave routine 67 in secure enclave 82, and then main enclave routine 67 calls ECIF stub 63. ECIF stub 63 then unmarshalls the identifier for PAP 74 from the stack and, in response, launches PAP 74 and supplies PAP 74 with the address for protected application 50A.

One important aspect of installing protected application 50A is to provide for application key 51B, which is needed to convert (decrypt) protected application 50A to plaintext protected application 50B, so that protected application 50B can be executed. Accordingly, as indicated at block 420, once PAP 74 is launched, it may determine (as part of the process for installing or provisioning protected application 50A) whether or not processing device 20 already contains protected application key 51A. To make that determination, PAP 74 may consult a protected application registry in VNC 48, for instance. In the embodiment of FIG. 2, if PAP 74 is unable to find protected application key 51A. PAP 74 may send a request for the key to a licensing authority for protected application 50A, as shown at block 422. The licensing authority may use remote processing device 12, for instance, to service key requests.

The licensing authority may do a license check before provisioning the application key to processing device 20. In one embodiment, the licensing authority will not release the application key to processing device 20 unless the licensing authority can verify that the user who is requesting the key has purchased the protected application. Accordingly, upon receipt of the key request, remote processing device 12 may send a request for authentication to processing device 20, as shown at block 423. If processing device 20 has not already been licensed to execute protected application 50A, processing device 20 may perform additional operations to obtain the license. For example, a user may be prompted to enter a verification code, to prove that the user purchased a valid, unused copy of protected application 50A. In addition or alternatively, PAP 74 may collect user identity data from the user.

As indicated at block 424, PAP 74 may then send authentication data (e.g., the verification code and/or the user identity data) to remote processing device 12, to prove that processing device 20 is (or should be) licensed to execute protected application 50A. Alternatively, PAP 74 may include some or all of the necessary authentication data when submitting the request for the key, instead of after submitting the request.

In addition, PAP 74 may be required to attest itself to the licensing authority. In one embodiment, PAP 74 provides for remote attestation by first performing a local attestation by generating a measurement report that can be verified by other enclaves running on the same processor in the same session. PAP 74 then uses a quoting enclave to verify and digitally sign the report, to make the report verifiable, globally. The digital signature will certify that the report, along with its attached data, was generated by an enclave having a specified measurement and running on an approved processor with enclave technology enabled. PAP 74 may send the signed report to the licensing authority. The challenger (e.g., license authority) may then determine, based on the report, whether or not to trust PAP 74. In one embodiment, the attached data in the report will contain some proof of purchase by the end user, and the License Agent could decide to honor or deny the request, based at least in part on that proof of purchase.

As shown at block 425, if the licensing authority accepts the authentication and attestation data as valid, remote processing device 12 may then send the key for protected application 50A to processing device 20. When the application key is sent to processing device 20, the licensing authority may use Secure Sockets Layer (SSL)/Transport Layer Security (TLS) or any other suitable means to protect the key.

In addition, since PAP 74 is running in a secure enclave, PAP 74 may be unable to access operating system APIs directly. However, VNC 48 may provide services to allow PAP 74 to access operating system services indirectly. Thus, PAP 74 may use services from VNC 48 to communicate with the licensing authority. In particular, ECOF 64 may serve as a proxy, VNC 48 may include a corresponding ECOF stub 65, and PAP 74 may use ECOF 64 to obtain services from operating system 32 via VNC 48. In addition or alternatively, native memory 90 may include a different entity, such as a PAP native counterpart (PNC), that provides services for PAP 74 in a manner similar to the way VNC 48 provides services for interpreter 44.

PAP 74 may then prepare to seal the application key against the identity of the enclave in which the protected application will subsequently be launched. Consequently, the application key could only be unsealed using the same identity as was used for sealing.

For purposes of this disclosure, the secure enclave that receives and seals the application key may be, referred to as the installation enclave, and the secure enclave, within which the protected application is authorized to execute may be referred to as the execution enclave.

Figure 3:
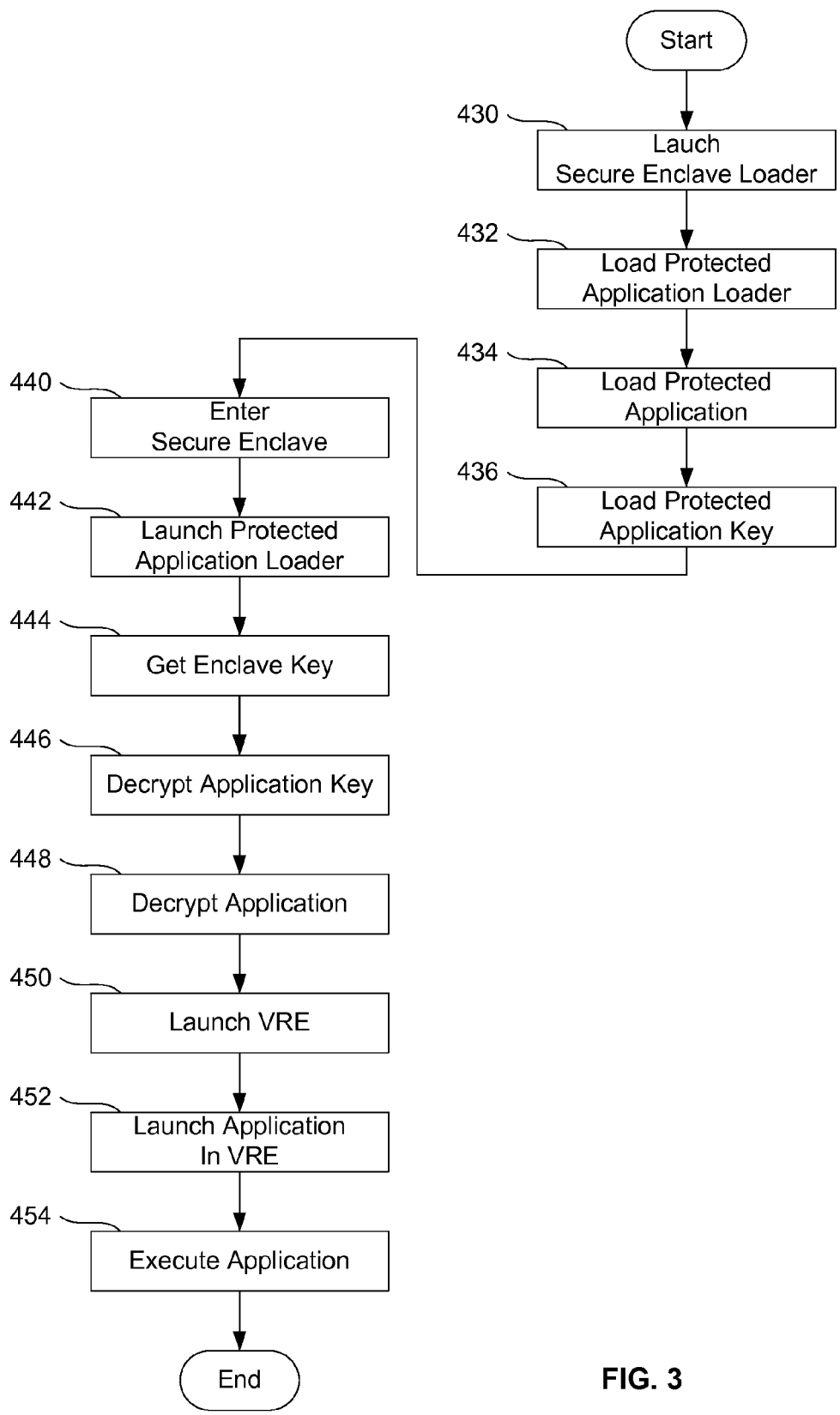
FIG. 3 is a flowchart of an example embodiment of a process for executing a protected application.

Different types of identity may be required for different embodiments or protected applications, depending on the preferences of the developer. In the embodiment of FIG. 3, the developer requires the application key to be sealed to an identity based on a measurement of the secure enclave (MR_ENCLAVE). MR_ENCLAVE may be a measurement (e.g., a hash) of the enclave, code and data. Accordingly, the secure enclave that PAP 74 has been running in also includes the components that will eventually be needed to execute the virtual application, such as PAL 76, VRE 42, and protected application 50A. For example, PAP 74 may be embedded or integrated into secure enclave 82, and PAP 74 may be linked statically with other components of the enclave, such as VRE 42. Therefore, PAP may share the enclave specific keys with VRE 42. Consequently, PAP 74 may obtain enclave key 84 based on the measurement 83 of secure enclave 82, as indicated at block 426. PAP 74 may use operations like those described below with regard to block 444 of FIG. 3 to obtain enclave key 84, for instance. As shown at block 427, PAP 74 may then seal the key for protected application 50A to secure enclave 82. For example, PAP 74 may use enclave key 84 to create an encrypted version 51A of application key 51B. For instance, PAP 74 may use symmetric encryption with enclave key 84 to seal the application key. And since PAP 74 and protected application 50A reside in the same enclave, or in separate enclaves sighed by the same key and sharing the same product ID (as indicated below), PAL 76 will be able to unseal the application key in subsequent sessions.

Alternatively, under some conditions, the developer may allow the measurement for the installation enclave to be different from the measurement for the execution enclave. For example, the developer may allow for the PAP to be part of the installation enclave but not the execution enclave. The execution enclave may only contain the PAL, the VRE, and the protected application, for instance. However, the application key must be sealed against the execution enclave in some manner. In such a case, the developer may require the application key to be sealed to an identity based on a hash or other measurement (MR_SIGNER) of a signing key (e.g., a Rivest Shamir Adleman (RSA) key) used to sign the execution enclave. Thus, instead of using the measurement of the installation enclave to seal the application key, the PAP seals the application key against MR_SIGNER. This approach allows for smaller enclaves (e.g., the PAP need not be linked in to the secure enclave for the protected application), although this approach might not be quite as secure. Furthermore, if MR_SIGNER is chosen in EGETKEY to derive the sealing key, any secret sealed by an enclave could be unsealed by any other enclaves that have the same "product ID" if the enclave is signed by the same signing key. For purposes of this disclosure, the "product ID" is a number that is assigned by the developer and embedded in the enclave signature. Processor 22 may provide instructions (e.g., EGETKEY) which allow programs to use that number along with the hash of a signing key to derive enclave specific keys. Furthermore, every enclave may have a secure version number (SVN) in its signature assigned by the developer. The SVN may also be included in key derivations. An enclave may request a derived key from MR_SIGNER by calling EGETKEY with a target SVN, and processor 22 will make sure the caller's SVN is at or above the target SVN before deriving the key. This approach ensures that to newer version of the same enclave could open blobs sealed by an older version, but not vice versa.

Referring again to FIG. 2, as shown at block 428, PAP 74 may then save protected application key 51A to HDD 30. In addition, PAP 74 may update a data structure in VNC 48 with data to tie protected application key 51A to protected application 50A and to specify where protected application key 51A is stored (e.g., by file path name). That data structure, may be referred to as a protected application registry (PAR) 60. More or less conventional techniques may be used to complete any addition installation steps required. The installation process may then end.

FIG. 3 is a flowchart of an example embodiment of a process for executing a protected application. In the embodiment of FIG. 3, before the illustrated process starts, protected application 50A and protected application key 51A have already been installed, with protected application key 51A sealed to secure enclave 82, for instance using a process, like the one described above. As shown at block 430, the process of FIG. 3 may then start with processing device 20 launching SEL 72, possibly in response to user input, such as a user double clicking on an icon for the protected application. SEL 72 may be preconfigured to launch the protected application 50B within secure enclave 82. Alternatively, processing device 20 may provide the SEL with parameters specifying the secure enclave to be launched and the application to be run in that secure enclave.

SEL 72 may then create and populate CMA 80. For example, as shown at blocks 432, 434, and 436, SEL 72 may load PAL 76, protected application 50A, protected application key 51A, and any other necessary data, into CMA 80. PAL 76 may use protected application registry 60 to find protected application key 51A. Alternatively, the protected application and other components could be embedded into the enclave, in which case those components would not need to be individually loaded into the CMA. SEL 72 may also load PAP 74 into CMA 80, so the measurement of secure enclave 82 will match the measurement used to seal the application key. In one embodiment, SEL 72 uses SE driver 34, and SE driver 34 executes instructions like EADD, EINIT, and EENTER for the operations described above. As shown at block 440. SEL 72 may then enter secure enclave 82. For example, SEL 72 may call ECIF 62 with parameters that identify PAL 76 as the program to be executed within the secure enclave after the secure enclave is entered and that identify the location of protected application 50A.

As shown at block 442, processing device 20 may then launch PAL 76 within secure enclave 82. In particular, processing device 20 may launch main enclave routine 67, main enclave routine 67 may launch ECIF stub 63, and ECIF stub 63 may unmarshall the parameters and launch PAL 76. As shown at block 444, PAL 76 may then derive enclave key 84 for secure enclave 82, based on secure enclave measurement 83. Enclave key 84 may be tied to secure enclave 82 and also tied to processor 22, and PAL 76 may use a specialized function or instruction to obtain enclave key 84. Such a specialized instruction may be referred to as an EGETKEY instruction. The EGETKEY instruction may derive enclave key 84 from a package-unique value in processor 22 (e.g., platform key 23) and from the identity of secure enclave 82. The "identity" of a secure enclave means the measurement (e.g., a 512-bit secure hash algorithm or "SHA-512" value) that reflects how the enclave was loaded or what it contains. Thus, two enclaves will have the same identity if and only if they occupy the same size of virtual address, have the same set of code and data pages, and those pages are mapped at the same addresses relative the enclave base address, and in the same order. In at least one embodiment, the EGETKEY instruction will always return the same value for the enclave key if called from a future instance of the same secure enclave on the same platform, but the EGETKEY instruction will return a different value if called from a different secure enclave. Additional details for the EGETKEY instruction may be found in the Secure Enclave Application. Since PAL 76 is running in secure enclave 82, the secure enclave's attestation infrastructure (e.g., the EGETKEY instruction) provisions enclave key 84 to PAL 76 securely.

As shown at block 446, PAL 76 may then use enclave key 84 to decrypt protected application key 51A, thereby generating protected application key 51B. As shown at block 448 of FIG. 3, PAL 76 may then use protected application key 51B to decrypt protected application 50A, thereby generating protected application 50B. As indicated in FIG. 1, the decrypted application may include main routine 54B, protected calling statement 56B, and protected called module 58B, each of which is also decrypted. In one embodiment, PAL 76 decrypts protected application 50A in place. Other approaches may be used in other embodiments, such as decrypting the protected application into open space that has already been allocated to the secure enclave.

As shown at block 450, PAL 76 may then use virtualization software 40 to create VRE 42 within secure enclave 82. PAL 76 may then transfer control to protected application 50B in VRE 42, as indicated at block 452. For instance, PAL 76 may call into the entry point for VRE 42 with parameters instructing VRE 42 to launch main routine 54B. Interpreter 44 may then execute protected application 50B, as shown at block 454. For instance, interpreter 44 may execute main routine 54B.

Furthermore, as described in greater detail below with regard to FIGS. 6 and 7, protected calling statement 56B may cooperate with native called module 45, and protected called module 58B may cooperate with native calling statement 47. The process of FIG. 3 may then end.

In one embodiment, PAL 76 is native code that runs in secure enclave 82. Other arrangements may be used in other embodiments. For instance, the PAL could be bytecode that runs on the interpreter in the secure enclave, or the PAL could be part of the interpreter. However, only the intended, enclave on the intended platform can open the sealed application key and decrypt the protected application. In at least one embodiment, the enclave must be exactly the same every time to get to the exact seal key used to decrypt the protected application key. In one embodiment, the PAL uses an attestation function or instruction to obtain unique attestation data for the secure enclave. This process may be referred to as "quoting." For example, the PAL may use EREPORT to generate a locally verifiable certificate for the quoting enclave to verify, and the certificate may then be signed digitally by the quoting enclave to become globally verifiable. The certificate may constitute a report containing all identifiable info for the enclave (e.g., the measurement, the hash of the signing key, the product ID, etc.), along with custom data provided by the enclave who invoked the EREPORT instruction.

Figure 4:
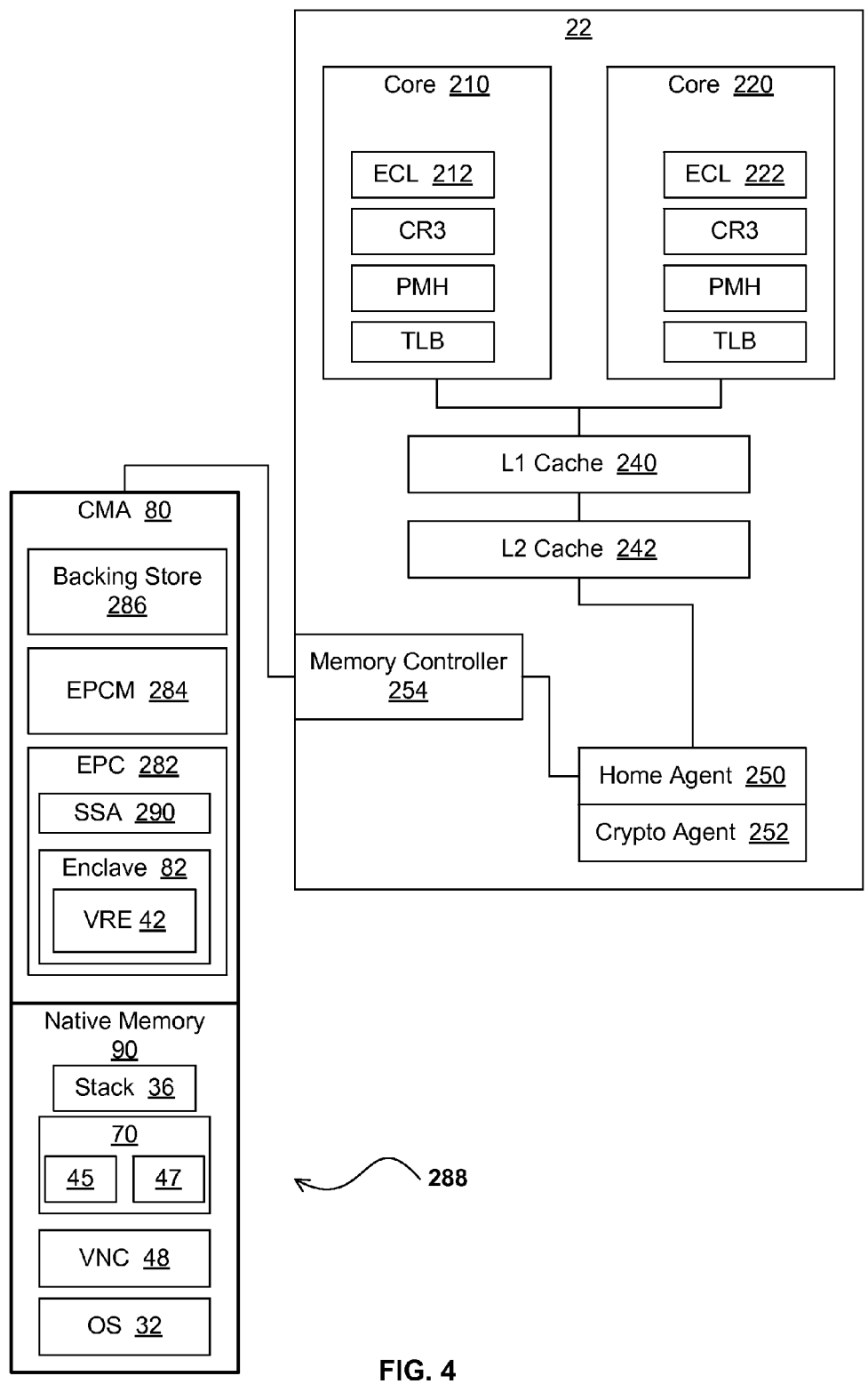
FIG. 4 is a block diagram showing certain features of the data processing system of FIG. 1 in greater detail.

FIG. 4 is a block diagram showing certain features of processing device 20 in greater detail. In particular, FIG. 4 focuses on processor 22 and RAM 26. In the illustrated embodiment, processor 22 is multi-core microprocessor, containing two processing cores 210 and 220. Each core includes various processing components, such as a translation lookaside buffer (TLB), a page miss handler (PMH), a control register number 3 (CR3). In addition, core 210 contains enclave control logic (ECL) 212, and core 212 contains enclave control logic (ECL) 222. Cores 210 and 220 may also share a level-1 (L1) cache 240. L1 cache 240 may transfer data to and from a higher-level, level-2, or last-level cache 242. A home agent 250 may connect to L2 cache 245 and to a crypto engine 252. Home agent 250 may access the physical address space 288 of CMA 80 through a memory controller 254.

CMA 80 may contain an enclave page cache (EPC) 282, an enclave page cache map (EPCM) 284, and a backing store 286 as part of the physical address space 288. Software such VRE 42 may run from within an enclave 82 within EPC 282. EPC 282 may also include an SSA 290 that provides space for saving state data or context for secure enclaves. Additional details on how a processing device may use features like those described above to protect the information in secure enclaves may be found in the Secure Enclave Application.

In addition to CMA 80, physical address space 288 contains the relatively unprotected native memory address space 90. VNC 48, operating system 32, and modules from native library 70 such as called module 45 and calling statement 47 may run from native memory 90.

Figure 5A:
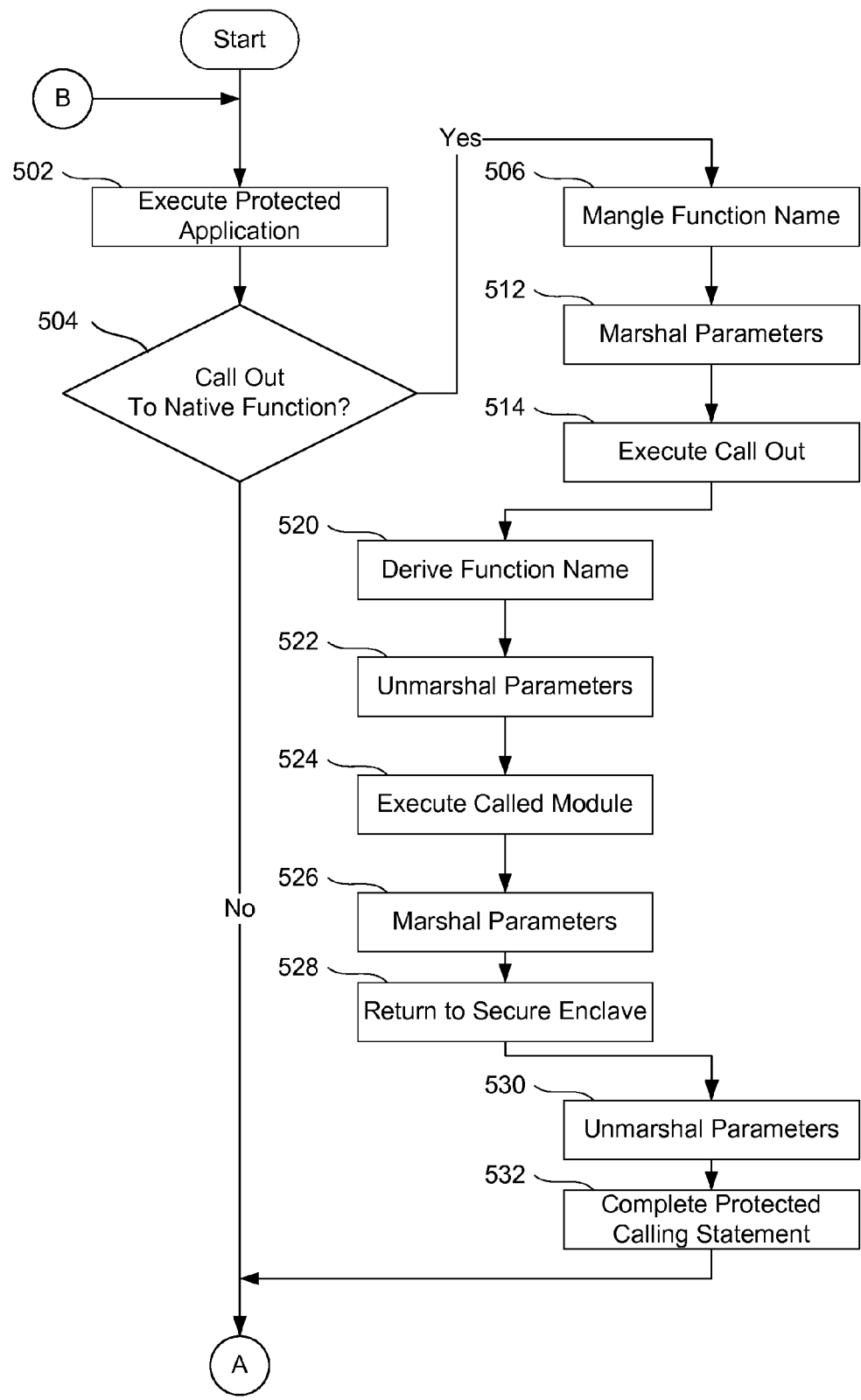
FIGS. 5A and 5B present a flowchart of an example embodiment of a process for supporting interaction between modules within a secure enclave and modules outside of the secure enclave.
Figure 5B:
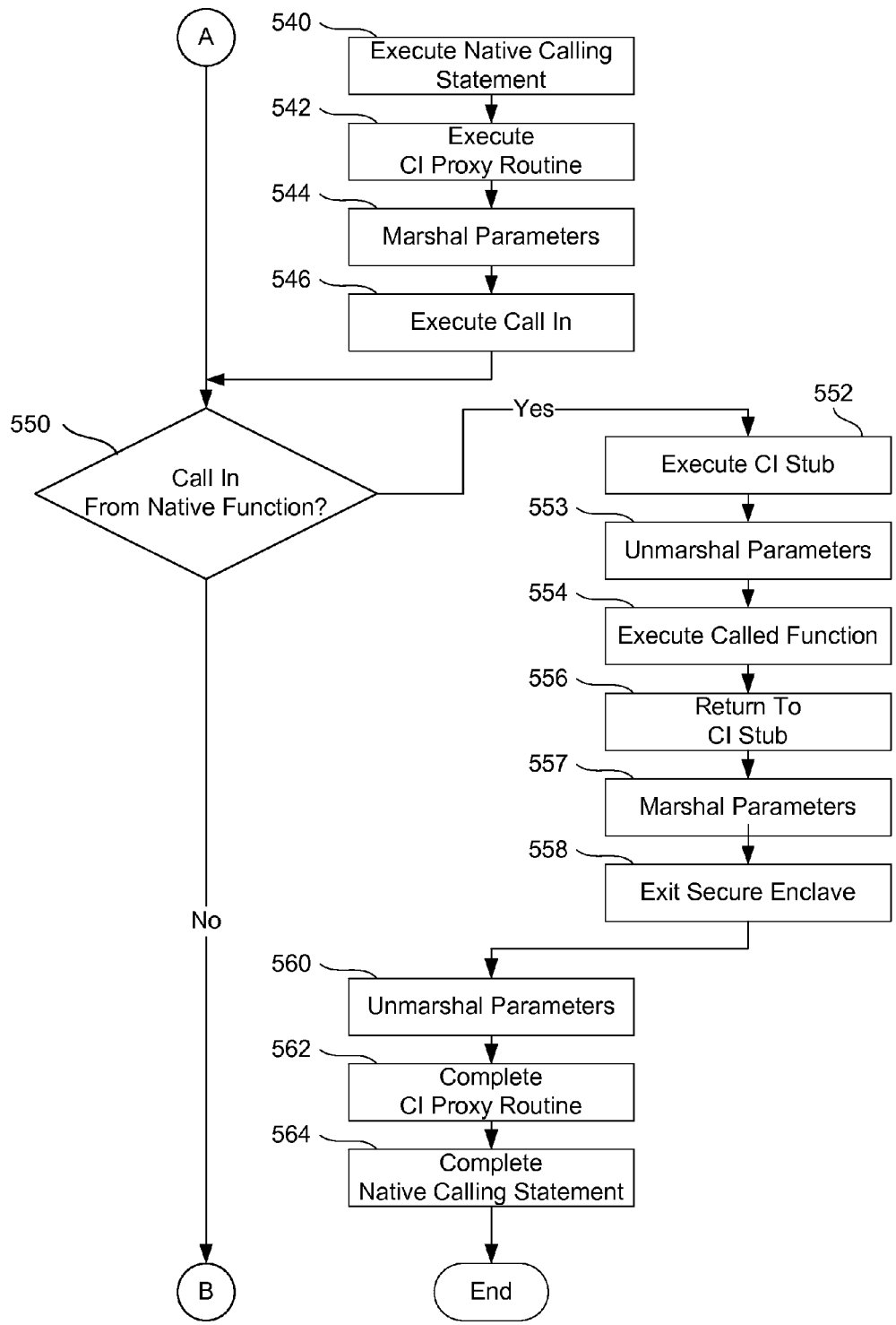
Figure 6A:
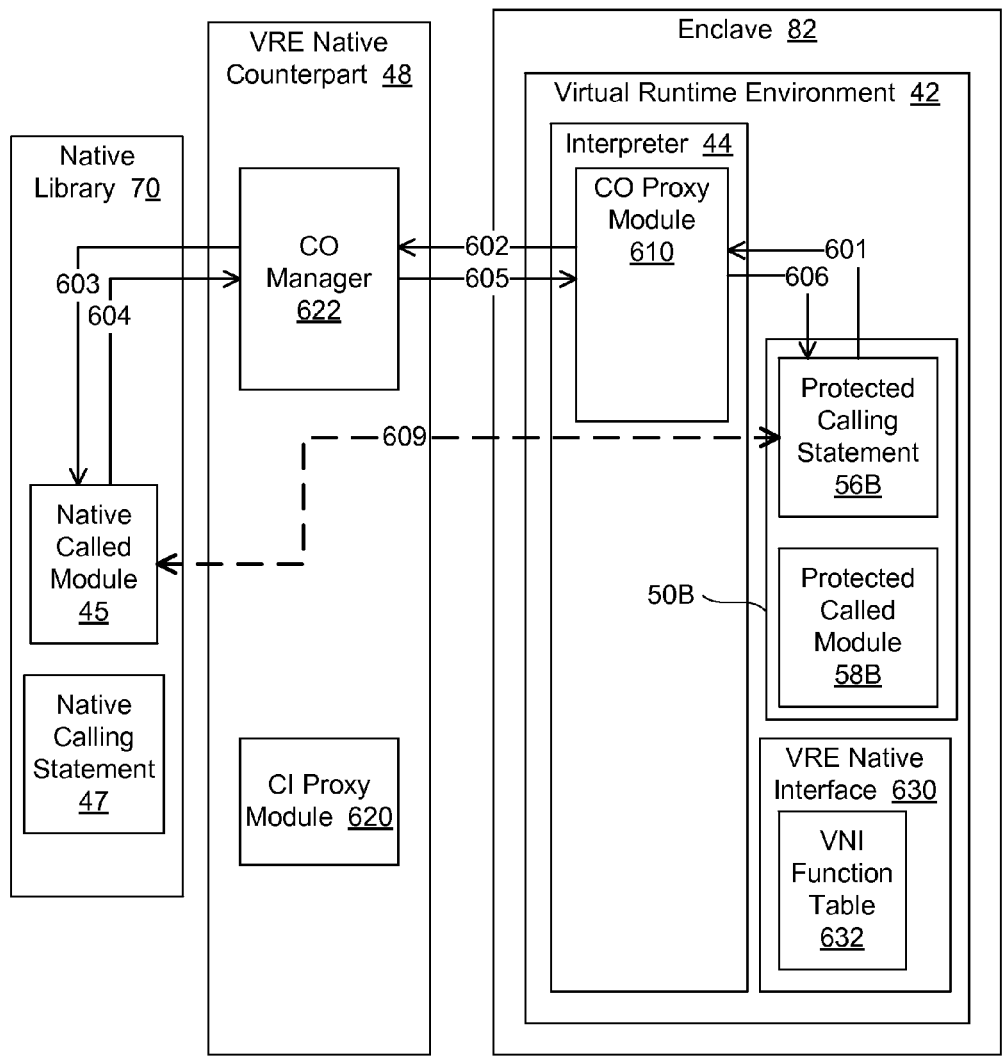
FIGS. 6A and 6B are block diagrams illustrating how some of the components of the data processing system of FIG. 1 may cooperate to support cooperation between modules inside a secure enclave and modules outside of the secure enclave.
Figure 6B:
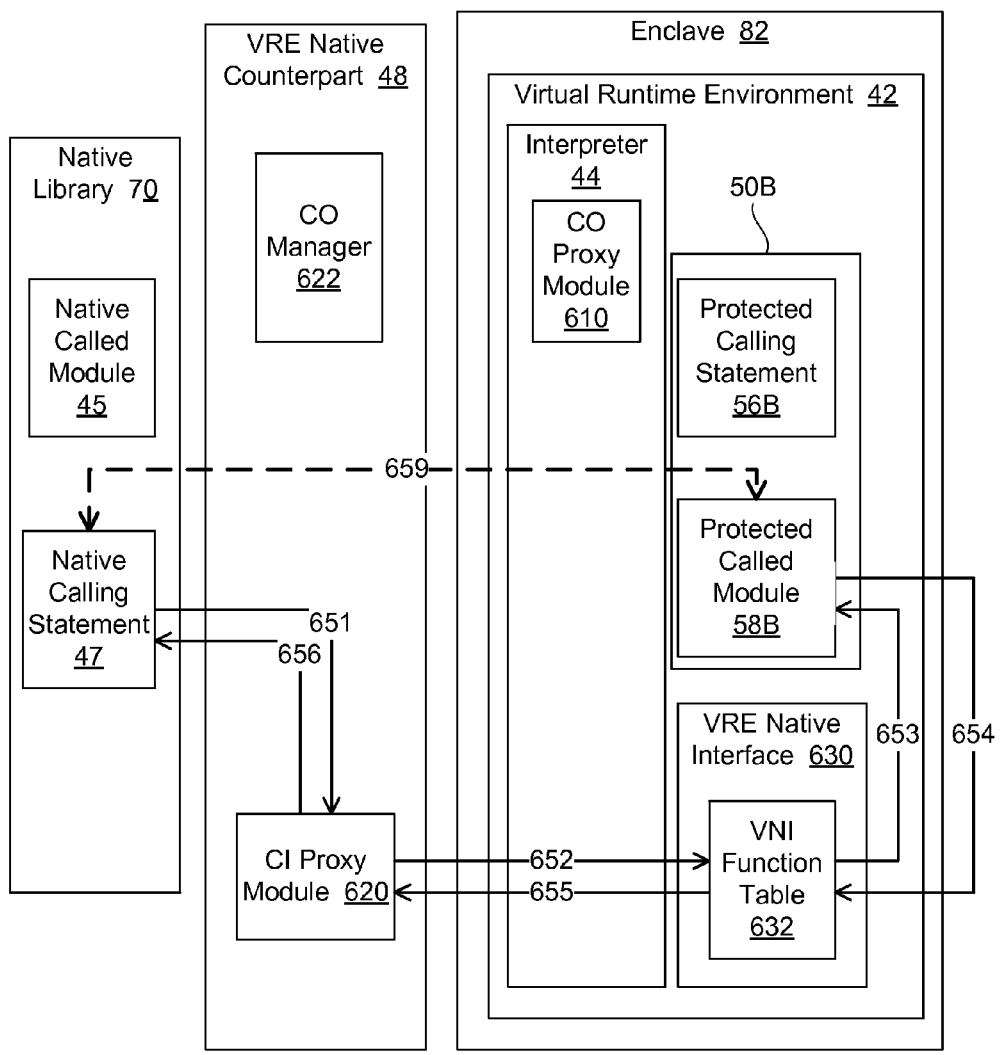

FIGS. 5A and 5B present a flowchart of an example embodiment of a process for supporting interaction between modules within secure enclave 82 and modules outside of secure enclave 82. In addition, FIGS. 6A and 6B are block diagrams illustrating how some of the components of processing device 20 may cooperate to support cooperation between modules inside of secure enclave 82 and modules outside of secure enclave 82. FIGS. 5A and 6A focus primarily on a call out from secure enclave 82 to a native function, while FIGS. 5B and 6B focus primarily on a call in to secure enclave 82 from a native function.

Dashed line 609 in FIG. 6A shows, from a high level perspective, that protected calling statement 56B in VRE 42 calls native called module 45 outside of secure enclave 82, with native called module 45 returning results to protected calling statement 56B. However, as described in greater detail below, the solid lines with arrow heads show, at a lower level, how those interactions are supported.

FIGS. 6A and 6B also show that VRE 42 may include a VRE native interface (VNI) 630, a VNI function table 632, and a call-out (CO) proxy module 610. CO proxy module 610 is described in greater detail below. As described m greater detail below, when VRE 42 handles calls to protected modules from outside of secure enclave 82, VRE 42 may use function stubs as intermediaries between the calling statement and the called function. Those function stubs may be referred to as call-in (CI) stubs, and they may be generated at build time before protected application 50B is installed on processing device 20, based on the functions, parameters, return types, etc. defined in protected application 50B. For instance when creating protected application 50B, the software developer may use application development tools to create CI stubs for components such as protected called module 58B. VNI 630 may operate more or less like a JNI. However, VNI function table 632 may reside in VNI 630, and the CI stubs may reside in VNI function table 632. Alternatively, the VNI function table could contain pointers or indexes to the CI stubs.

At or after build time, the software developer may also generate a corresponding CI proxy routine for each CI stub. The CI proxy routines and CI proxy stubs may include control logic for transferring control across the enclave boundary and for marshalling and unmarshalling, parameters to facilitate communication across the enclave boundary. The CI proxy routines may be based on the names, parameters, and return types of the CI proxy stubs, for instance.

VNC 48 may include a CI proxy module 620 and a CO manager 622. CO manager 622 is described in greater detail below. CI proxy module 620 may include the CI proxy routines referenced above. Alternatively, a CI proxy module could contain pointers or indexes to CI proxy routines. CI proxy module 620 may operate more or less like a JNI environment (JNIEnv) interface. However, instead of carrying out the called function like a JNIEnv, CI proxy module 620 may marshall the parameters for the called function and then send control to VRE 42 for invocation of the called function. In particular, CI proxy module 620 may use the CI proxy routines to perform operations like marshalling parameters for called functions and then sending control to VRE 42.

The process of FIG. 5A starts with protected application 50B running in VRE 42 within secure enclave 82, as indicated at block 502. As shown at block 504, interpreter 44 may then determine whether protected application 50B is trying to call a module outside of secure enclave 82. For instance, interpreter 44 may be interpreting protected calling statement 56B, which calls native called module 45. If protected application 50B is trying to call an outside module or function (e.g., native called module 45), interpreter 44 may use CO proxy module 610 to handle the call.

Referring also to FIG. 6A, line 601 depicts interpreter 44 using CO proxy module 610 to handle a call from protected calling statement 56B to native called module 45.

CO proxy module 610 may then automatically perform operations that enable control and information to pass out of secure enclave 82 and back into secure enclave 82. Thus, CO proxy module 610 may serve as a generic or general purpose proxy routine.

For instance, as indicated at block 506 of FIG. 5A, CO proxy module 610 may use any suitable mangling rules to generate a unique name or identifier for native called module 45. CO proxy module 610 may generate that identifier based on attributes of the function such as class name, method name, argument types, and return type, for instance. Thus, CO proxy module 610 may encode those attributes into the identifier that CO proxy module 610 generates for native called module 45. In addition, SSA 290 may include a pointer to the stack 36 for the current thread, and CO proxy module 610 may then marshall the parameters for the native function onto stack 36, as shown at block 512. For instance, CO proxy module 610 may (a) load the identifier and the parameter values for the native function into a marshalling buffer; (b) update the value of a stack pointer register (RSP) inside SSA 290 to allocate space on stack 36 for the marshalling buffer; and (c) then push that marshalling buffer onto stack 36. For example, if 100 bytes are needed for the marshalling buffer, CO proxy module 610 may decrement the stack pointer by 100 bytes. As illustrated in FIG. 4, unlike the CMA 80, stack 36 may reside in native memory 90. Stack 36 may be managed by operating system 32, for instance. Consequently, the marshalling buffer may be accessed after control has left secure enclave 82.

As shown at block 514, after marshalling the parameters, CO proxy module 610 may call the native routine. In one embodiment, CO proxy module 610 uses ECOF 64 to call the native routine. In one embodiment, ECOF 64 executes an EEXIT instruction. The EEXIT instruction may cause control to pass to the proxy routine that had originally called EENTER to enter secure enclave 82. When that proxy receives control, the thread uses the new value for the stack pointer. That proxy then determines whether control should then be passed back up to its caller, or to CO manager 622 if the EEXIT was due to a call from within secure enclave 82 to a module outside of secure enclave 82. Since the current process involves a call to a module outside of secure enclave 82, the proxy will invoke CO manager 622.

Referring again to FIG. 6A, line 602 depicts CO proxy module 610 calling out from secure enclave 82, and CO manager 622 in VNC 48 subsequently receiving control.

As shown at block 520, CO manager 622 in VNC 48 may then serve as a generic or general purpose native stub for handling calls from secure enclave 82. CO manager 622 may use the same basic kinds of policies to handle those calls as those used by CO proxy module 610. For instance, CO manager 622 may pop out the function name or identifier (e.g., the function's address) and unmarshall the parameters for native called module 45 from stack 36, as shown at blocks 520 and 522. As shown at block 524, CO manager 622 may then call native called module 45.

Line 603 in FIG. 6A also depicts control passing from CO manager 622 to native called module 45. When native called module 45 is finished executing, control may pass back to CO manager 622, as indicated by line 604 in FIG. 6A. As shown at block 526, CO manager 622 may then marshall the return parameters onto the stack. As shown at block 528, CO manager 622 may then return control to CO proxy module 610. Line 605 in FIG. 6A also shows control returning to CO proxy module 610.

In particular, CO manager 622 may use EENTER to reenter the enclave. Accordingly, control may first pass to the entry point for the secure enclave, such as main enclave routine 67. Main enclave routine 67 may then distinguish between new calls into secure enclave 82 and returning calls from secure enclave 82 to native functions, and main enclave routine 67 may then restore the stack pointer appropriately. For returning calls, execution will resume at the instruction that follows EEXIT inside the ECOF 64. ECOF 64 may then invoke CO proxy module 610.

As shown at block 530 of FIG. 5A, CO proxy module 610 may then unmarshall the parameters from stack 36. CO proxy module 610 may then supply those parameters to protected calling statement 56B, thereby completing the call from protected calling statement 56B to native called module 45, as shown at block 532. Line 606 in FIG. 6A also indicates that protected calling statement 56B, in effect, completes execution.

In another embodiment, CO proxy routines are generated in advance, before the interpreter starts executing a protected application and/or a protected calling statement. Those CO proxy routines may be compiled into native code and linked into the protected application, or they may be written in bytecode and just-in-time (JIT) compiled, for instance. Those CO proxy routines may include control logic for performing the operations described above with regard to CO proxy module 610. A CO proxy generator may generate that control logic based on the argument types and the return type for the called module, for instance. The CO proxy routines may then be saved in a CO proxy module, or the CO proxy module may be loaded with information to enable the interpreter to find those routines. Thus, the CO proxy module may look up the correct proxy based on the fully qualified name of the called module. The interpreter for the VRE may consult the CO proxy module wherever a call-out statement is encountered, and the interpreter could generate an error (e.g., an exception) should no proxy be found. Alternatively, a CO proxy module may dynamically generate CO proxy routines as needed, for instance in response to the interpreter reaching a call-out statement. Depending on requirements, the CO proxy module may be configured to generate CO proxy routines in native code, or in bytecode, which could be JIT compiled into native code.

Similarly, a CO manager may automatically generate and launch a distinct native function stub for each native module in response to that native module being called. In addition or alternatively, the CO manager may be populated in advance with some or all of the necessary native stubs (e.g., before the native modules are called).

Referring again to block 532 of FIG. 5A, after protected calling statement 56B has completed, the process may then pass through page connector A to FIG. 5B. As shown at block 550, VNI 630 may then determine whether a native statement is calling a module of protected application 50B VRE 42. For instance, native calling statement 47 may be calling protected calling module 58B, possibly via the corresponding CI proxy routine and CI stub.

In the embodiment of FIGS. 5B and 6B, protected application 50B provides a fixed set of functions, such as protected called module 58B, which can be called by native code. Protected called module 58B may be identified by a descriptor, which is an opaque structure internal to VRE 42. In a conventional processing system, a native calling statement locates a descriptor for a module in a VRE by providing at runtime the module's fully qualified name, comprised of the package, class, and method names. Other approaches may be used in other embodiment. As indicated above, processing device 20 includes CI proxy routines and CI stubs for functions or modules in VRE 42 that may be called from outside of secure enclave 82.

Block 540 of FIG. 5B shows native calling statement 47 executing a call to protected called module 58B. However, from a high-level perspective, VNC 48 intercepts that call and, in response to the call, executes the corresponding the CI proxy routine, as shown at block 542. As shown at block 544, the CI proxy routine may then marshall parameters for the CI stub. As shown at block 546, the CI proxy routine may then use ECIF 62 to call protected called module 58B via the CI stub. As shown at block 550, VNI 630 may intercept that call. If VNI 630 determines that the CI proxy routine for protected called module 58B is calling the CI stub for protected called module 58B, VNI 630 may execute that CI stub, as indicated at block 552. As shown at block 553, the CI stub may then unmarshall parameters from the CI proxy routine. As shown at block 554, the CI stub may then call protected called module 58B. The CI proxy routine and the CI stub may use the stack to marshall and unmarshall parameters.

Referring now to FIG. 6B, dashed line 659 shows, from a high level perspective, that native calling statement 47 outside of secure enclave 82 calls protected calling module 58B in VRE 42 within secure enclave 82, with protected calling module 58B returning results to native calling statement 47. However, the solid lines with arrow heads show, at a lower level, how those interactions are supported. For example, VNC 48 may serve as an intermediary between native calling statements and VRE 42. For instance, VNC 48 may use CI proxy module 620 to handle calls to VNI 630. And as indicated above, CI proxy module 620 may use CI proxy routines as intermediaries between native calling statements and protected called modules. Also, as indicated above, VNI function table 632 may be preloaded with CI stubs.

To invoke protected called module 58B, native calling statement 47 may actually call CI proxy routine from CI proxy module 620, as indicated by line 651. That CI proxy routine may call a CI stub from VNI function table 632, as indicated by line 652. That CI stub may call protected called module 58B, as indicated by line 653. Line 654 shows that control returns to the CI stub when protected called module 58B completes execution. Line 655 shows that control returns to the CI proxy routine when the CI stub completes execution. Line 656 shows that control returns to native calling statement 47 when the CI proxy routine completes execution.

Referring again to FIG. 5B, protected called module 47 returns control to the CI stub upon completion, as shown at block 556. As shown at block 557, the CI stub may then marshall parameters a return value) for consumption by the CI proxy routine. For instance, the CI stub may gather all parameters and lay them out continuous on untrusted stack, as described above. As shown at block 558, the CI stub may then cause the process or thread to exit secure enclave 82, with control returning to the CI proxy routine. For instance, the CI stub may return with the value returned by protected called module 58B. The CI proxy routine may then resume execution, unmarshalling parameters from the CU stub, as shown at block 560. As shown at block 562, the CI proxy routine my complete, with control then returning to calling statement 47. As shown at block 564, calling statement 47 may then resume, receiving results from protected called module 58B, via the correspond CI stub and CI proxy routine. Execution outside of secure enclave 82 may then end, or it may continue, depending on whether native calling statement 47 is the end of a program. And within VRE 42, within secure enclave 82, execution of protected application 50B may continue, as indicated at block 502 of FIG. 5A, which may be reached via page connector B of FIG. 5B.

One or more embodiments are described above with regard to a virtual runtime environment. In other embodiments, the teaching of the present disclosure may be used in other environments. For instance, those environments may use interpretive languages such as those distributed under the names or trademarks C#, JAVASCRIPT, etc. to decrypt and execute protected applications.

One or more embodiments may provide the following advantages: The technology may provide for secure execution of a protected application, even though the memory pages containing that application could be marked as writable. The technology may allow code in a secure enclave to call or otherwise utilize services from code outside of the enclave, even though only code that resides within the enclave may be executed in the enclave. For instance, the technology may allow an applet or other code running in a VRE to communicate with and invoke the applet's dependent native libraries. The technology may also provide for transparent marshalling of parameters for transportation across the enclave boundary in both directions: calls in to the enclave and calls out of the enclave.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, minicomputers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, statements, functions, procedures, data structures, application programs, configuration settings, and other kinds of data. As described above, when the data is accessed by a machine, the machine may respond by performing tasks, defining abstract data types or low-level hardware contexts, and/or performing other operations. For instance, data storage, RAM, and/or flash memory may include various sets of statements which, when executed, perform various operations. Such statements may be referred to as instructions, and sets of statements may be referred to in general as software. In addition, the term "program" may be used in general to cover a broad range of software constructs, including applications, applets, routines, modules, drivers, subprograms, processes, and other types of software components. Also, programs and/or other data that are described above as residing on a particular device in an example embodiment may, in other embodiments, reside on one or more other devices. And computing operations that are described above as being performed on a particular device in an example embodiment may, in other embodiments, be executed by one or more other devices.

It should also be understood that the hardware and software, components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described, operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with features for protecting software from unauthorized copying. The data processing system comprises a secure enclave loader which enables the data processing system to create a secure enclave. The data processing system also comprises a protected application loader which, when executed in the secure enclave, enables the data processing system to perform operations comprising (a) automatically decrypting an encrypted program in the secure enclave, thereby generating a decrypted version of the program; and (b) after automatically decrypting the encrypted program in the secure enclave, automatically executing the decrypted version of the program in the secure enclave.

Example A2 includes the features of Example A1, and when the data processing system creates the secure enclave, the secure enclave comprises protected storage that cannot be accessed from outside of the secure enclave. Also, the operation of automatically decrypting the encrypted program in the secure enclave comprises storing the decrypted version of the program in the protected storage.

Example A3 includes the features of Example A1, and the operation of automatically decrypting the encrypted program in the secure enclave comprises using a key that is tied to the secure enclave to decrypt the encrypted program in the secure enclave. Example A3 may also include the features of Example A2.

Example A4 includes the features of Example A1. Also, the secure enclave loader enables the data processing system to include virtualization software in the secure enclave. Also, the virtualization software enables the data processing system to create a virtual runtime environment (VRE) in the secure enclave. Also, an interpreter in the VRE enables the data processing system to execute the decrypted version of the program in the secure enclave. Example A4 may also include of any one or more of Examples A2 and A3.

Example A5 includes the features of Example A1. Also, the secure enclave comprises an execution enclave. Also, the secure enclave loader enables the data processing system to create a secure enclave to serve as an installation enclave. In addition, the data processing system comprises a protected application provisioner which, when executed in the installation enclave, enables the data processing system to perform operations comprising (a) obtaining, from within the installation enclave, a program key capable of decrypting the encrypted program; and (b) sealing the program key in a way that ties the sealed program key to the execution enclave. Example A5 may also include the features of any one or more of Examples A2, A3, and A4.

Example A6 includes the features of Example A5. Also, the protected application provisioner enables the data processing system to perform operations comprising (a) using a measurement associated with the execution enclave to obtain an enclave key for the execution enclave, and (b) using the enclave key to decrypt the program key. Also, the operation of decrypting the encrypted program comprises using the decrypted program key to decrypt the encrypted program in the secure enclave. Example A6 may also include the features of any one or more of Examples A2, A3, and A4.

Example A7 includes the features of Example A5. Also, the installation enclave and the execution enclave have matching enclave measurements. Also, the sealed program key is tied to the measurement of the installation enclave. Example A7 may also include the features of any one or more of Examples A2, A3, A4, and A6.

Example A8 includes the features of Example A5. Also, the installation enclave and the execution enclave have different enclave measurements. Also, the sealed program key is tied to a signing key for the execution enclave. Example A8 may also include the features of any one or more of Examples A2, A3, A4, and A6.

Example B1 is a method for protecting a program from unauthorized copying. The method comprises creating a secure enclave in a processing device, and in response to a request to execute an encrypted program in the processing device, performing operations comprising (a) automatically generating a decrypted version of the program in the secure enclave by decrypting the encrypted program in the secure enclave; and (b) after automatically generating the decrypted version of the program in the secure enclave, automatically executing the decrypted version of the program in the secure enclave.

Example B2 includes the features of Example B1. Also, the secure enclave comprises protected storage that cannot be accessed from outside of the secure enclave. Also, the operation of automatically generating the decrypted version of the program in the secure enclave comprises storing the decrypted version of the program in the protected storage.

Example B3 includes the features of Example B1. Also, the operation of automatically generating the decrypted version of the program in the secure enclave comprises using a key that is tied to the secure enclave to decrypt the encrypted program in the secure enclave. Example B3 may also include the features of Example B2.

Example B4 includes the features of Example B1. Also, the operation of creating the secure enclave is performed by a secure enclave loader. Also, the operation of automatically generating a decrypted version of the program in the secure enclave is performed by a protected application loader in the secure enclave. Example B4 may also include the features of any one or more of Examples B2 and B3.

Example B5 includes the features of Example B1. Also, the operation of creating the secure enclave comprises including virtualization software in the secure enclave. In addition, the method comprises using the virtualization software to create a virtual runtime environment (VRE) in the secure enclave, and the decrypted version of the program is executed in the secure enclave by an interpreter for the VRE. Example B5 may also include the features of any one or more of Examples B2, B3, and B4.

Example B6 includes the features of Example B1. Also, the secure enclave comprises an execution enclave. In addition, the method comprises, before decrypting the encrypted program in the secure enclave: (a) saving the encrypted program in unprotected storage; (b) creating a secure enclave to serve as an installation enclave; (c) obtaining, from within the installation enclave, a program key capable of decrypting the encrypted program; and (d) sealing the program key in a way that ties the sealed program key to the execution enclave. Example B6 may also include the features of any one or more of Examples B2, B3, B4, and B5.

Example B7 includes the features of Example B6, and the method further comprises (a) using a measurement associated with the execution enclave to obtain an enclave key for the execution enclave, and (b) using the enclave key to decrypt the program key. Also, the operation of automatically generating the decrypted version of the program comprises using the decrypted program key to decrypt the encrypted program in the secure enclave. Example B7 may also include the features of any one or more of Examples B2, B3, B4, and B5.

Example B8 includes the features of Example B6. Also, the operation of sealing the program key in a way that ties the sealed program key to the execution enclave is performed by a protected application provisioner executing with the installation enclave. Example B8 may also include the features of any one or more of Examples B2, B3, B4, B5, and B7.

Example B9 includes the features of Example B6. Also, the installation enclave and the execution enclave have matching enclave measurements, and the program key is tied to the measurement of the installation enclave. Example B9 may also include the features of any one or more of Examples B2, B3, B4, B5, B7, and B8.

Example B10 includes the features of Example B6. Also, the installation enclave and the execution enclave, have different enclave measurements, and the program key is tied to a signing key for the execution enclave. Example B10 may also include the features of any one or more of Examples B2, B3, B4, B5, B7, and B8.

Example B11 includes the features of Example B1. Also, the operation of decrypting the encrypted program comprises using a key for the encrypted program to decrypt the encrypted program. In addition, the method comprises, before using the key to decrypt the encrypted program, (a) sending authentication data to a licensing authority to prove that the processing device is authorized to use the program, and (b) obtaining the key only after sending the authentication data to the licensing authority. Example B11 may also include the features of any one or more of Examples B2, B3, B4, B5, B6, B7, B8, B9, and B10.

Example B12 includes the features of Example B11. In addition, the method comprises (a) saving an encrypted version of the key in the processing device, and (b) automatically decrypting the encrypted version of the key in the secure enclave. Example B12 may also include the features of any one or more of Examples B2, B3, B4, B5, B6, B7, B8, B9, and B10.

Example B13 includes the features of Example B12. Also, the operation of automatically decrypting the encrypted version of the key in the secure enclave is performed in response to the request to execute the encrypted program. Example B13 may also include the features of any one or more of Examples B2, B3, B4, B5, B6, B7, B8, B9, and B10.

Example C is at least one machine accessible medium comprising computer instructions for protecting software from unauthorized copying. The computer instructions, in response to being executed on a data processing system, enable the data processing system to perform a method according to any of Examples B1 through B13.

Example D is a data processing system with features for protecting software from unauthorized copying. The data processing system comprises a processing element, at least one machine accessible medium responsive to the processing element, and computer instructions stored at least partially in the at least one machine accessible medium. The computer instructions, in response to being executed, enable the data processing system to perform a method according to any of Examples B1 through B13.

Example E is a data processing system with features for protecting software from unauthorized copying. The data processing system comprises means for performing a method according to any of Examples B1 through B13.

Example F1 is at least one machine accessible medium comprising computer instructions fir protecting software from unauthorized copying. The computer instructions, in response to being executed on a data processing system, enable the data processing system to pectoral operations comprising (a) creating a secure enclave in the data processing system, and (b) in response to a request to execute an encrypted program in the data processing system, performing operations comprising (i) automatically generating a decrypted version of the program in the secure enclave by decrypting the encrypted program in the secure enclave; and (ii) after automatically generating the decrypted version of the program in the secure enclave, automatically executing the decrypted version of the program in the secure enclave.

Example F2 includes the features of Example F1. Also, the secure enclave comprises protected storage that cannot be accessed from outside of the secure enclave. Also, the operation of automatically generating the decrypted version of the program in the secure enclave comprises storing the decrypted version of the program in the protected storage.

Example F3 includes the features of Example F1. Also, the operation of automatically generating the decrypted version of the program in the secure enclave comprises using a key that is tied to the secure enclave to decrypt the encrypted program in the secure enclave. Example F3 may also include the features of Example F2.

Example F4 includes the features of Example F1. Also, the operation of creating the secure enclave comprises including virtualization software in the secure enclave. In addition, the operations further comprise using the virtualization software to create a virtual runtime environment (VRE) in the secure enclave. The decrypted version of the program is executed in the secure enclave by an interpreter for the VRE. Example F4 may also include the features of any one or more of Examples F2 and F3.

Example F5 includes the features of Example F1. Also, the secure enclave comprises an execution enclave. In addition, the operations comprise, before decrypting the encrypted program in the secure enclave: (a) saving the encrypted program in unprotected storage: (b) creating a secure enclave to serve as an installation enclave; to obtaining, from within the installation enclave, a program key capable of decrypting the encrypted program; and (d) sealing the program key in a way that ties the sealed program key to the execution enclave. Example F5 may also include the features of any one or more of Examples F2, F3, and F4.

Example F6 includes the features of Example F1. In addition, the operations comprise (a) using a measurement associated with the execution enclave to obtain an enclave key for the execution enclave, and (b) using the enclave key to decrypt the program key. Also, the operation of automatically generating the decrypted version of the program comprises using the decrypted program key to decrypt the encrypted program in the secure enclave. Example F6 may also include the features of any one or more of Examples F2, F3, F4, and F5.

Example F7 includes the features of Example F1. Also, the installation enclave and the execution enclave have matching enclave measurements, and the program key is tied to the measurement of the installation enclave. Example F7 may also include the features of any one or more of Examples F2, F3, F4, F5, and F6.

Example F8 includes the features of Example F1. Also, the installation enclave and the execution enclave have different enclave measurements, and the program key is tied to a signing key for the execution enclave. Example F8 may also include the features of any one or more of Examples F2, F3, F4, F5, and F6.

Example F9 includes the features of Example F1. In addition, the operations comprise (a) saving an encrypted version of the key in the processing device, and (b) automatically decrypting the encrypted version of the key in the secure enclave. Example F9 may also include the features of any one or more of Examples F2 through F8.

What is claimed is:

1. A data processing system with features to provide protection against unauthorized copying, the data processing system comprising:
   a processor;
   a machine accessible memory responsive to the processor;
   a secure enclave loader which is to enable the data processing system:
   (a) to use an operating system component to convert an unprotected region of the memory into a secure enclave, wherein the secure enclave comprises protected storage that is inaccessible from outside of the secure enclave; and
   (b) to include virtualization software in the secure enclave, wherein the virtualization software is to create a virtual runtime environment (VRE) in the secure enclave;
   a protected application loader which, when executed in the secure enclave, is to enable the data processing system:
   (a) to use a key that is tied to the secure enclave to automatically decrypt an encrypted version of a program in the secure enclave, thereby generating a decrypted version of the program;
   (b) to store the decrypted version of the program in the protected storage in the secure enclave; and
   (c) after automatically decrypting the encrypted version of the program in the secure enclave, to automatically execute the decrypted version of the program in the secure enclave; and
   at least one intermediary component which is to enable interaction between (a) the decrypted version of the program that executes within the secure enclave and (b) software outside of the secure enclave, wherein the at least one intermediary component comprises:
(a) a call-out proxy module that is to enable the decrypted version of the program that executes within the secure enclave to call the software outside of the secure enclave; and
(b) a VRE native interface in the virtualization software that is to enable the software which executes outside of the secure enclave to call the decrypted version of the program in the secure enclave; and
wherein the VRE is to enable the decrypted version of the program to execute in the secure enclave when called by the software which executes outside of the secure enclave.

2. A data processing system according to claim 1, further comprising a call-out manager which is to enable the data processing system to automatically generate a native function stub in response to a call from inside the secure enclave to the software outside of the secure enclave.

3. A data processing system according to claim 1, wherein the call-out proxy module is to enable the data processing system to automatically generate a call-out proxy routine, in response to detection of a call-out statement in the program.

4. A data processing system according to claim 1, wherein: the key that is tied to the secure enclave comprises a program key;
the secure enclave comprises an execution enclave;
the secure enclave loader is to enable the data processing system to create a different secure enclave to serve as an installation enclave; and
the data processing system further comprises a protected application provisioner which, when executed in the installation enclave, is to enable the data processing system to perform operations comprising:
obtaining the program key from within the installation enclave; and
sealing the program key in a way that ties the sealed program key to the execution enclave.

5. A data processing system according to claim 4, wherein the protected application provisioner is to enable the data processing system to perform operations comprising:
using a measurement associated with the execution enclave to obtain an enclave key for the execution enclave; and
using the enclave key to decrypt the program key; and
wherein the operation of using the key that is tied to the secure enclave to automatically decrypt the encrypted version of the program comprises using the decrypted program key to decrypt the encrypted version of the program in the execution enclave.

6. A data processing system according to claim 4, wherein:
the installation enclave and the execution enclave have matching enclave measurements;
and
the sealed program key is tied to the measurement of the installation enclave.

7. A data processing system according to claim 4, wherein:
the installation enclave and the execution enclave have different enclave measurements;
and
the sealed program key is tied to a signing key for the execution enclave.

8. A method to provide protection against unauthorized copying, the method comprising:
using an operating system component to convert an unprotected region in a memory of a processing device into a secure enclave, wherein the secure enclave comprises protected storage that is inaccessible from outside of the secure enclave;
including virtualization software in the secure enclave;
using the virtualization software to create a virtual runtime environment (VRE) in the secure enclave;
in response to a request to execute a program in the processing device, performing operations comprising:
using a key that is tied to the secure enclave to automatically decrypt an encrypted version of the program in the secure enclave, thereby generating a decrypted version of the program;
storing the decrypted version of the program in the protected storage in the secure enclave; and
after automatically decrypting the encrypted version of the program in the secure enclave, automatically executing the decrypted version of the program in the secure enclave; and
using at least one intermediary component to enable interaction between (a) the decrypted version of the program that executes within the secure enclave and (b) software outside of the secure enclave, wherein the at least one intermediary component comprises (a) a call-out proxy module that enables the decrypted version of the program that executes within the secure enclave to call the software outside of the secure enclave and (b) a VRE native interface in the virtualization software that enables the software which executes outside of the secure enclave to call the decrypted version of the program in the secure enclave; and
wherein the VRE enables the decrypted version of the program to execute in the secure enclave when called by the software which executes outside of the secure enclave.

9. A method according to claim 8, further comprising:
using a call-out manager to automatically generate a native function stub in response to a call from inside the secure enclave to the software outside of the secure enclave.

10. A method according to claim 8, wherein the call-out proxy module enables the processing device to automatically generate a call-out proxy routine, in response to detection of a call-out statement in the program.

11. A method according to claim 8, wherein:
the key that is tied to the secure enclave comprises a program key; the secure enclave comprises an execution enclave; and
the method further comprising, before decrypting the encrypted version of the program in the secure enclave:
saving the encrypted version of the program in unprotected storage;
creating a different secure enclave to serve as an installation enclave; obtaining the program key from within the installation enclave; and
sealing the program key in a way that ties the sealed program key to the execution enclave.

12. A method according to claim 11, further comprising:
using a measurement associated with the execution enclave to obtain an enclave key for the execution enclave; and
using the enclave key to decrypt the program key; and
wherein the operation of using the key that is tied to the secure enclave to automatically decrypt the encrypted version of the program comprises using the decrypted program key to decrypt the encrypted version of the program in the secure enclave.

13. A method according to claim 11, wherein:
the installation enclave and the execution enclave have matching enclave measurements; and
the program key is tied to the measurement of the installation enclave.

14. A method according to claim 11, wherein:
the installation enclave and the execution enclave have different enclave measurements; and
the program key is tied to a signing key for the execution enclave.

15. At least one non-transitory machine accessible medium comprising computer instructions to provide protection against unauthorized copying, wherein the computer instructions, in response to being executed on a data processing system, enable the data processing system to perform operations comprising:
using an operating system component to convert an unprotected region in a memory of the data processing system into a secure enclave, wherein the secure enclave comprises protected storage that is inaccessible from outside of the secure enclave;
including virtualization software in the secure enclave;
using the virtualization software to create a virtual runtime environment (VRE) in the secure enclave;
in response to a request to execute a program in the data processing system, performing operations comprising:
using a key that is tied to the secure enclave to automatically decrypt an encrypted version of the program in the secure enclave, thereby generating a decrypted version of the program;
storing the decrypted version of the program in the protected storage in the secure enclave; and
after automatically decrypting the encrypted version of the program in the secure enclave, automatically executing the decrypted version of the program in the secure enclave; and
wherein the computer instructions comprise at least one intermediary component which enables interaction between (a) the decrypted version of the program that executes within the secure enclave and (b) software outside of the secure enclave, wherein the at least one intermediary component comprises (a) a call-out proxy module that enables the decrypted version of the program that executes within the secure enclave to call the software outside of the secure enclave and (b) a VRE native interface in the virtualization software that enables the software which executes outside of the secure enclave to call the decrypted version of the program in the secure enclave; and
wherein the VRE enables the decrypted version of the program to execute in the secure enclave when called by the software which executes outside of the secure enclave.

16. At least one non-transitory machine accessible medium according to claim 15, wherein the computer instructions enable the data processing system to perform operations comprising:
using a call-out manager to automatically generate a native function stub in response to a call from inside the secure enclave to the software outside of the secure enclave.

17. At least one non-transitory machine accessible medium according to claim 15, wherein the call-out proxy module enables the data processing system to automatically generate a call-out proxy routine, in response to detection of a call-out statement in the program.

18. At least one non-transitory machine accessible medium according to claim 15, wherein:
the key that is tied to the secure enclave comprises a program key; the secure enclave comprises an execution enclave; and
the operations further comprise, before decrypting the encrypted version of the program in the secure enclave:
saving the encrypted version of the program in unprotected storage;
creating a different secure enclave to serve as an installation enclave;
obtaining the program key from within the installation enclave; and
sealing the program key in a way that ties the sealed program key to the execution enclave.

19. At least one non-transitory machine accessible medium according to claim 18, wherein the operations further comprise:
using a measurement associated with the execution enclave to obtain an enclave key for the execution enclave; and
using the enclave key to decrypt the program key; and
wherein the operation of using the key that is tied to the secure enclave to automatically decrypt the encrypted version of the program comprises using the decrypted program key to decrypt the encrypted version of the program in the secure enclave.

20. At least one non-transitory machine accessible medium according to claim 18, wherein:
the installation enclave and the execution enclave have matching enclave measurements; and
the program key is tied to the measurement of the installation enclave.

21. At least one non-transitory machine accessible medium according to claim 18, wherein:
the installation enclave and the execution enclave have different enclave measurements; and
the program key is tied to a signing key for the execution enclave.

22. At least one non-transitory machine accessible medium according to claim 15, wherein the operations further comprise:
saving an encrypted version of the key in the data processing system; and
automatically decrypting the encrypted version of the key in the secure enclave.

* * * * *